United States Patent [19]
Johnson

[11] 3,894,311
[45] July 15, 1975

[54] HIDE PULLING DEVICES

[75] Inventor: Edward Arvid Johnson, Winnipeg, Canada

[73] Assignee: Johnson Bros. Manufacturing Ltd., Winnipeg, Canada

[22] Filed: July 16, 1973

[21] Appl. No.: 361,477

[52] U.S. Cl. .................................................. 17/21
[51] Int. Cl. ............................................ A22b 5/16
[58] Field of Search ............................... 17/21, 50

[56] References Cited
UNITED STATES PATENTS
| | | | |
|---|---|---|---|
| 3,129,454 | 4/1964 | Johnson | 17/21 |
| 3,423,789 | 1/1969 | Ochylski | 17/21 |
| 3,599,277 | 8/1971 | Brown | 17/21 |

FOREIGN PATENTS OR APPLICATIONS
| | | | |
|---|---|---|---|
| 1,960,890 | 6/1971 | Germany | 17/21 |

Primary Examiner—Paul E. Shapiro
Attorney, Agent, or Firm—Stanley G. Ade

[57] ABSTRACT

The hide puller is inclined from the base to the upper end, in the direction of travel of the conveyor so that the conveyor does not have to be stopped during the pulling operation, as the speed of hide stripping is such that the stripping action starts when the carcass reaches the lower end of the puller and is completed by the time that the carcass reaches the upper end of the puller. A hold down device is provided having a carriage in an inclined plane actuated by a fluid operator, to hold the front legs braced against the pulling action and maintaining substantially even tension between the hide and the puller as the hide is stripped over the head of the carcass. This prevents undue strain being placed upon the carcass which may damage same unless this movable carriage was provided.

8 Claims, 3 Drawing Figures

HIDE PULLING DEVICES

BACKGROUND OF THE INVENTION

This invention relates to new and useful improvements in hide pulling devices particularly for hide pulling devices which include an endless chain, the front run of which is guided around a compound concave curve in order to facilitate the pulling of the hide from a beef animal or the like suspended from an overhead rail.

Conventionally the hide puller is situated vertically and the front feet of the animal held by a fixed device forwardly of the hide puller in order to brace the animal between this hold down device and the overhead rail so that the hide can be stripped therefrom.

SUMMARY OF THE INVENTION

The present invention includes two principal improvements to conventional hide pullers.

Firstly, the hide puller is designed to pull the hide from the head as well as from the body and secondly, the hide puller is designed to be used with a moving rail without the necessity of stopping the rail during the pulling operation.

The principal object and essence of the invention is therefore to provide a device of the character herewithin described which facilitates the pulling of the hide over the head and which can be used upon a moving rail.

Another object of the invention is to provide a device of the character herewithin described in which the hold down device includes a carriage moving on an inclined plane and actuated automatically by the hide puller.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 2:
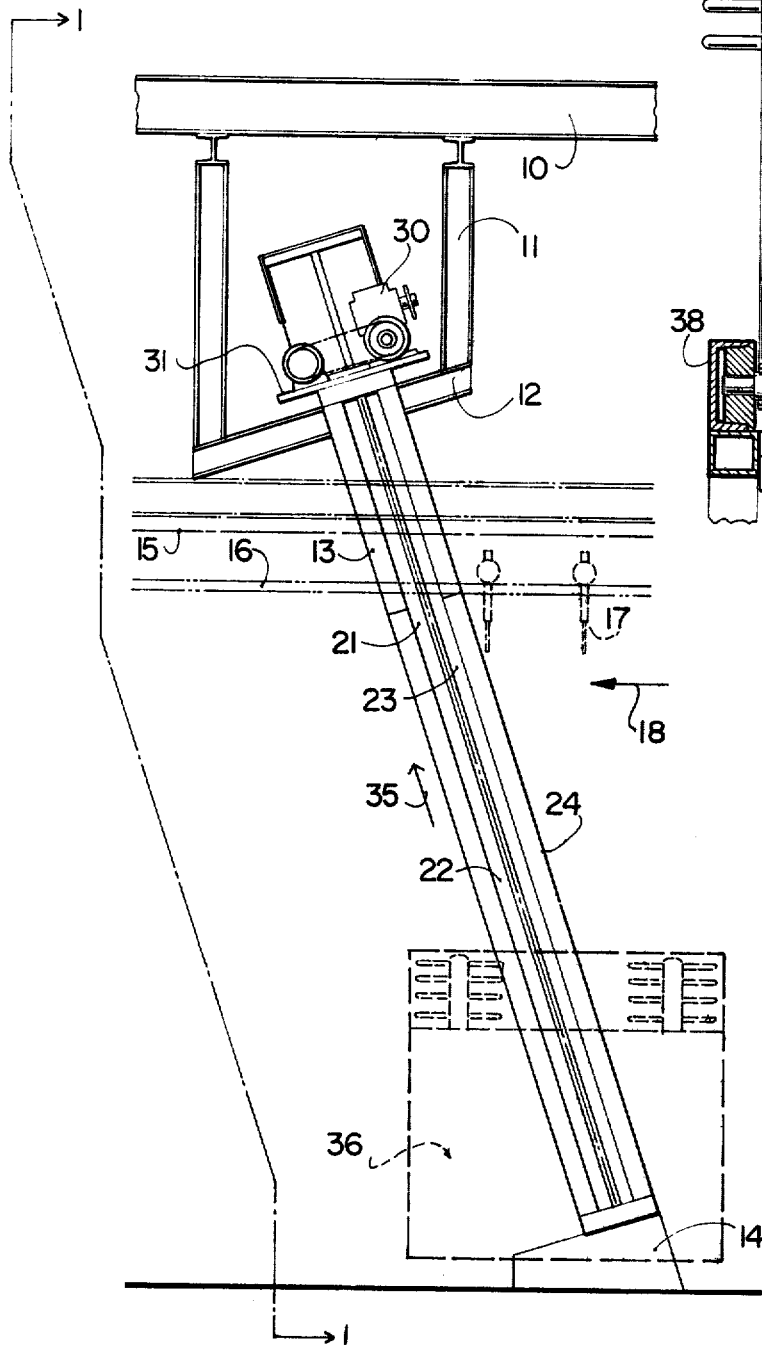
FIG. 2 is a front elevation of the puller showing the angle of inclination.

Proceeding therefore to describe the invention in detail, reference should first be made to FIG. 2 in which 10 illustrates a main structural beam situated overhead with framework 11 secured thereto including a base 12.

The hide puller collectively designated 13 is secured to this base member 12 and extends vertically downwardly to be secured upon a base block 14.

The conveyor chain is shown schematically by reference character 15 and the conveyor rail by reference character 16 with carcass suspension pulleys being indicated at 17.

The direction of the conveyor is indicated by arrow 18 and the hide puller is inclined so that the upper end is in advance of the lower end when viewed in front elevation. In other words the hide puller inclines in the direction of motion of the conveyor from the lower end of the hide puller towards the upper end thereof.

This means that as the stripping operation proceeds, the conveyor chain can continue to move in the direction of arrow 18, it being understood that the hide stripping operation commences at the base of the puller and terminates at the upper end thereof as will be hereinafter be described.

This angle of inclination is approximately 18° from the vertical and the speed of the hide pulling chain is such that the hide is fully stripped off by the time the carcass has advanced from a position substantially in alignment with the lower end of the hide puller to a position substantially in alignment with the upper end of said hide puller.

Figure 1:
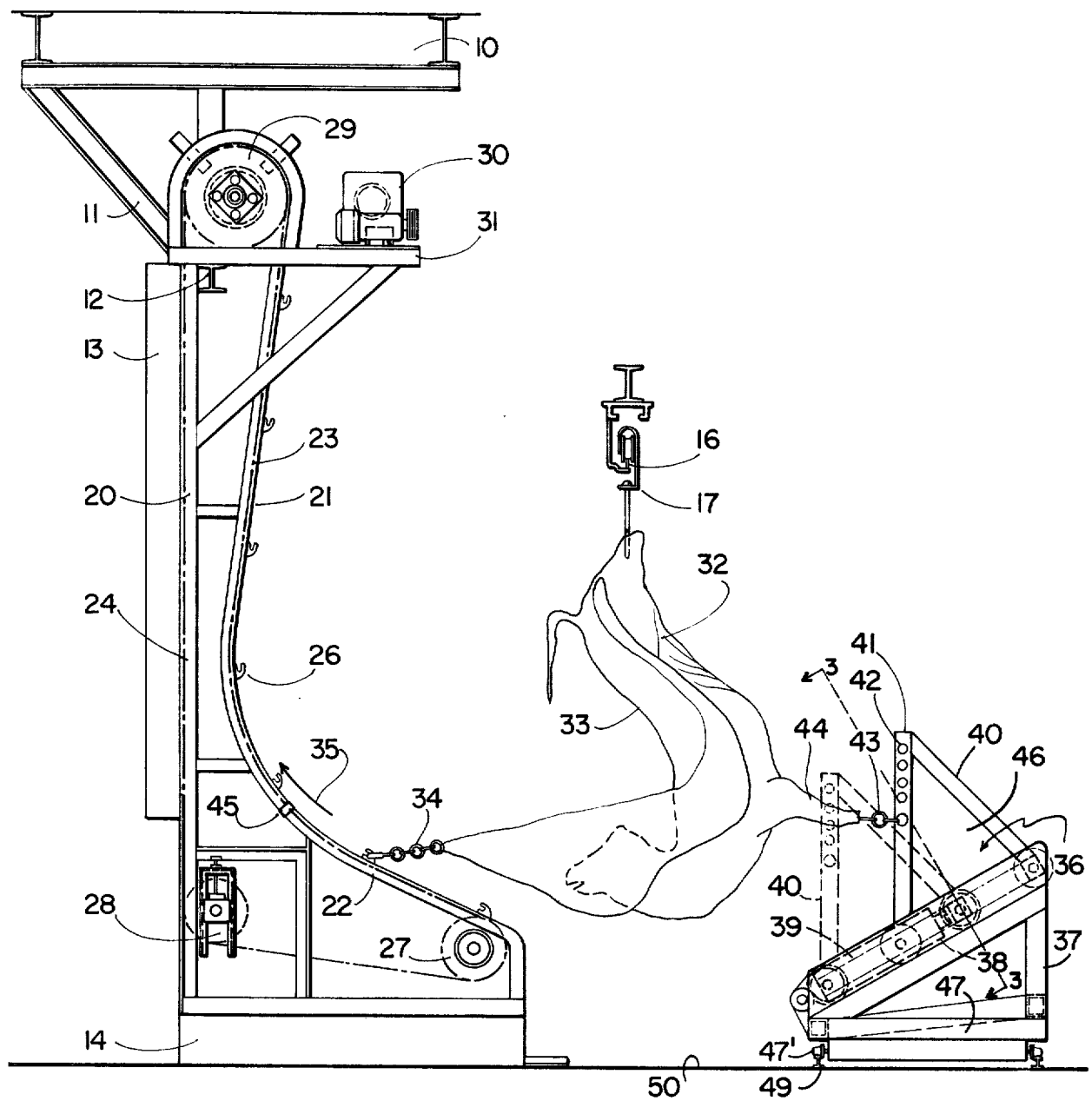
FIG. 1 is a side elevation of the hide puller with the hold down device shown.

In FIG. 1, which is a side view substantially along the line 1—1 of FIG. 2, the basic hide puller is shown including vertical members 20 and the compound curved front guides 21 and is conventional.

These front guides include the arcuately curved lower portion 22 terminating in the substantially straight portion 23 which then inclines upwardly towards the upper end thereof.

The members 24 are a pair of spaced and parallel angle irons with an endless chain 25 being guided by the under surfaces thereof and having hooks 26 extending through the gap between the members 24.

The chain is routed around a base guide pulley 27, an adjustable rear pulley 28 and a driven upper pulley 29, said upper pulley being driven by the source of power 30 contained within an upper platform 31.

In normal operation, the carcass 32 is suspended from the rail 16 by means of the carcass carrying hooks 17 with the back 33 of the animal towards the hide puller. The hide is rimmed back and then is secured by means of chains 34 to any one of the hooks 26 travelling in the direction of arrow 35.

Means are provided to hold or brace the carcass consisting of the hold down device collectively designated 36. This consists of a substantially triangular framework 37 having upwardly inclined guide members 38 between which is situated a fluid piston and cylinder assembly 39. The actual hold down device or carriage 40 includes the vertical members 41 with outstanding pins 42 thereon over which chains 43 may be engaged and in turn secured to the front legs 44 of the animal as clearly shown. Triangular plates 46 brace the spaced and parallel members 41 to the substantially rectangular base frame 40C.

Figure 3:
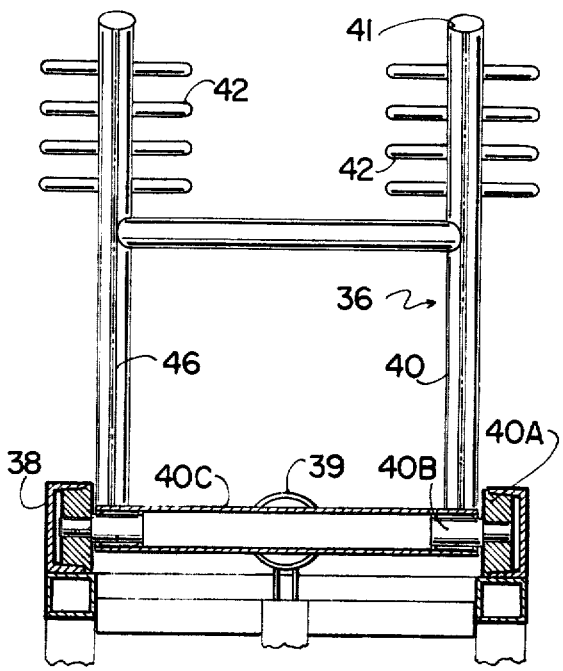
FIG. 3 is an enlarged cross sectional view of the hold down device along the line 3—3 of FIG. 1.

The portion 40 can move up and down the inclined ramp 38 actuated by the fluid piston and cylinder assembly 39. By means of wheels 40A mounted on stub axles 40B, extending from adjacent the corners of the base frame 40C of the portion or carriage 40. These wheels engage the channel members 38 as clearly shown in FIG. 3.

It is desirable to brace the carcass during the initial head stripping operation, in the position shown in FIG. 1 but if movement was not provided for the components 40 and 41, as the hook 26 carrying chains 34 traversed the concave portion 22, the strain would be too great and there is a danger of breaking the back of the carcass. Furthermore, if the carriage was fixed, then the possibility exists that the head of the carcass would engage the lower end of the puller which could cause contamination and is generally not permitted in packing house procedures.

I therefore provide a switch 45 which is adapted to be engaged by the hook 26 carrying chains 34. This switch is operatively connected to a source of fluid pressure (not illustrated) and is adapted to actuate the piston and cylinder assembly 30 and retracts same at this point thus allowing the components 40 and 41 to move downwardly to the lowermost position shown in phantom in FIG. 1 thus allowing the carcass to move closer to the hide puller during this curved traverse by the hook 26 and chains 34.

The inclined ramp effect 38 is essential so that as the carriage or component 40 moves upwardly and downwardly it tends to follow closely the arc traversed by the hook 26 and chains 34 as they pass through the curved path so that a relatively constant tension is maintained under the conditions of pulling the hide over the head and from the shoulder and back area adjacent to the shoulders.

Once the hide has been stripped from the head, the hide puller operates in the conventional way and strips the hide from the back of the animal, completing the operation as the carcass reaches the position on the conveyor in alignment with the upper end of the hide puller.

Finally, it should be noted that the hold down device can be fixed as shown in FIG. 2 or can move with the carcass parallel to the rail 16 as shown in FIG. 1.

In this instance wheels 47 are journalled at the underside of the base 48 of the triangular structure and engage a pair of rails 49 secured to the supporting surface or floor 50 and running parallel to the rail 16. As the carcass moves along the rail 16 the hold down device is pulled along the rails 49.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a hide puller which includes an endless chain, the front run of which travels around a compound concave curved path and having a plurality of hooks extending therefrom and a carcass carrying rail positioned spaced from said puller along which carcasses are conveyed by a conveyor chain and supported from said chain by the rear legs thereof with the back of the carcass facing said puller, the improvement comprising a hold down device spaced from said puller whereby said carcass is adapted to pass between said hold down device and said puller, said hold down device including means to maintain relatively constant tension between said hold down device and the hide being stripped by said puller.

2. The device according to claim 1 in which said means includes a base for said hold down device, an upwardly and rearwardly inclining ramp mounted on said base, a carriage engaging said ramp for movement up and down said ramp, a fluid operator for moving said carriage on said ramp and means on said carriage to detachably secure the front legs of the associated carcass during the pulling operation.

3. The device according to claim 2 in which said carriage includes a pair of substantially spaced and parallel vertically situated members and wheel engaging said ramp, said means including a plurality of chain link engaging pins extending horizontally upon each side of said vertically situated members.

4. The device according to claim 3 in which said hide puller is inclined from the vertical parallel to the longitudinal axis of said rail whereby the upper end of said puller inclines in the direction of travel of said conveyor chain whereby the hide is stripped from the carcass as said carcass is moved by said conveyor chain from a position substantially in alignment with the lower end of said hide puller to a position substantially in alignment with the upper end of said hide puller.

5. The device according to claim 2 in which said hold down device includes means mounting same for horizontal movement parallel to said carcass carrying rail.

6. The device according to claim 5 in which said hide puller is inclined from the vertical parallel to the longitudinal axis of said rail whereby the upper end of said puller inclines in the direction of travel of said conveyor chain whereby the hide is stripped from the carcass as said carcass is moved by said conveyor chain from a position substantially in alignment with the lower end of said hide puller to a position substantially in alignment with the upper end of said hide puller.

7. The device according to claim 2 in which said hide puller is inclined from the vertical parallel to the longitudinal axis of said rail whereby the upper end of said puller inclines in the direction of travel of said conveyor chain whereby the hide is stripped from the carcass as said carcass is moved by said conveyor chain from a position substantially in alignment with the lower end of said hide puller to a position substantially in alignment with the upper end of said hide puller.

8. A hold down device for use with hide pulling machines for stripping hides from carcasses, said carcasses being suspended from an overhead conveyor and being detachably secured to said hold down device by the front legs of said carcass; comprising in combination a base frame; vertical members extending upwardly from the outer ends of said base frame, and inclined members extending from between the front ends of said base frame to the upper ends of said vertical members and constituting an inclined ramp, a carriage engageable upon said ramp for movement therealong, fluid operator means on said hold down device for moving said carriage up and down said ramp, and means on said carriage to detachably secure the front legs of the associated carcass.

* * * * *